Patented June 12, 1951

2,556,566

UNITED STATES PATENT OFFICE 2,556,566

METHOD FOR PREPARING N-PYRIDYL-N-THENYL ALKYLENE DIAMINES

Arthur W. Weston, Waukegan, Ill., assignor to Abbott Laboratories, North Chicago, Ill., a corporation of Illinois No Drawing. Application October 17, 1946, Serial No. 703,719

4 Claims. (Cl. 260—293.4)

My invention relates to new compositions of matter and more particularly to certain heterocyclic compounds, including the thiophene ring.

Although it is possible for a skilled chemist, knowing certain physical properties and the behavior of a substance toward various chemical reagents, to predict with reasonable accuracy corresponding physical properties and probable chemical reactivity of substances, such as homologs, related to the known compound, it is not generally possible for even an experienced worker to predict the physiological activity of chemical compounds. For example, certain of the vitamins are highly specific in physiological activity and changes in molecular structure that produce little difference in physical properties or chemical reactivity cause extreme differences in physiological activity. In vitamin $B_1$, when the amino-group of the amino-pyrimidine moiety is replaced by a hydroxyl group, the characteristic physiological activity is destroyed; dihydro-vitamin $B_1$ is inactive although dihydrococarboxylase is active. When in vitamin $B_1$, the methyl group occupying the 2-position in the pyrimidine moiety is shifted to the 6-position the second compound possesses but a small fraction of the activity of the first. Vitamin $B_2$, riboflavin, when alkylated in the 3-position, loses entirely its characteristic activity. Vitamin $B_6$ benzoate is inactive although the di- and tri-acetate of the vitamin are fully active; the methyl-ether of the vitamin possesses but $1/500$ of the activity of the vitamin. Dextro-rotatory pantothenic acid is fully active: the laevorotatory isomer is inactive. The acetate, benzoate and diphosphate of pantothenic acid are inactive; dehydro-ascorbic acid is fully active.

More specifically, the thiophene analog of Demerol, also called Dolantin is less active than the original material, and there are other instances where thiophene derivatives have been found to be less active than the corresponding benzenoid compound.

The novel compounds of this invention are variously useful. For example they are generally useful as chemical intermediates, and have been found to possess capacity for producing various physiological effects. Among the known effects thus far ascertained is the property of combating the symptoms of histamine activity, including urticaria, asthma, hay fever and other allergies, by means of oral, intravenous, intramuscular, topical and other administration.

The compounds of this invention can be prepared by the following methods among others:

(1) A compound containing a pyridine ring with the amino group in the alpha position is reacted with an omega dialkyl amino alkyl halide by treatment with an alkali metal amide or hydride in an inert hydrocarbon solvent. The halide is preferably a chloride or bromide, the alkali metal preferably sodium and the inert solvent may be benzene toluene, xylene, or petroleum ether of proper boiling point. The $\alpha$-(dialkyl amino alkyl amino) pyridine thus produced is reacted with the appropriate $\alpha$ haloalkyl thiophene by means of an alkali metal hydride or amide in an inert solvent to produce an N-($\alpha$-pyridyl) - N - ($\alpha$-thenyl)-N',N'-dialkyl alkylene diamine. The preferred halides, hydrides, amides, and solvents are the same as previously mentioned.

(2) (a) The order of reacting the starting materials may be changed from that given in Method 1. An $\alpha$-amino-pyridine may be first reacted with an $\alpha$-haloalkylthiophene to produce an $\alpha$-pyridyl-$\alpha$-thenylamine.

(2) (b) The same product may be obtained by reacting an $\alpha$-thenylamine with an $\alpha$-halopyridine. Subsequent condensation with an $\omega$-alkylaminoalkyl halide produces the same end product as Method 1. The reagents used are the same as in Method 1.

(3) An N,N-dialkylalkylenediamine is condensed with an $\alpha$-haloalkylthiophene by treatment with an alkali metal amide or hydride in an inert solvent such as benzene, toluene, xylene, or high boiling point petroleum ether or by heating in the presence of pyridine. The N-($\alpha$-thenyl)-N',N'-dialkylalkylenediamine thus formed is reacted with an $\alpha$-halopyridine in the presence of an alkali metal amide or hydride or pyridine or other acid-binding agent to yield an N-($\alpha$-pyridyl)-N-($\alpha$-thenyl)-N',N'-dialkylalkylenediamine.

(4) By condensation of a dialkyl amine with a compound of the formula

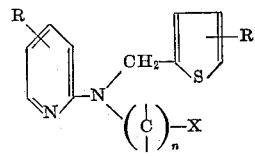

where R is hydrogen or alkyl, $n$ is a small whole number, and X is chlorine, bromine, iodine or hydroxyl. If X is a hydroxyl group, the condensation is facilitated by the presence of zinc chloride; if X is halogen then the reaction should be carried out in the presence of an acid binding agent such as the usual tertiary amines pyridine, quinoline and dimethylaniline, or in excess of the secondary amine.

(5) By converting a compound of the general formula

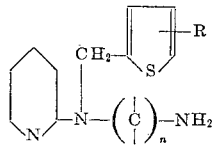

where R and n have the same significance as in Process 4, into a compound in which —NH₂ has been replaced by

where R₁ and R₂ are alkyl groups, by the usual methods, such as reacting with alkyl halides, alkyl sulfates, or alkyl sulfonates. The compound containing —NH₂ may be prepared by reduction of the appropriate compound containing an —NO₂ or —CN group.

The invention may be illustrated by the following examples:

EXAMPLE 1

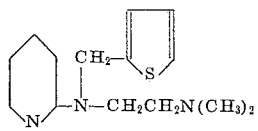

To a suspension of 1.5 g. of sodium hydride in benzene, 10 g. of N-(α-pyridyl)-N',N'-dimethylethylenediamine is slowly added followed by a four hour period of refluxing and stirring. After the addition of 8 g. of α-thenyl chloride, the mixture is stirred and refluxed several hours longer. Water is cautiously added, the benzene layer separated, then extracted several times with dilute hydrochloric acid. The acidic extracts are made alkaline and the basic material taken up in ether. The oil which remains after removing the solvent distills at 160–161° C. at 2 mm., $n_D^{25}$, 1,5846. There is thus obtained 9.6 g. or 66% of N-(α-pyridyl)-N-(α-thenyl)-N',N'-dimethyl-ethylenediamine.

1a

By the addition of methyl iodide to the base produced in Example 1, the quaternary ammonium salt is formed. This salt, N-(α-pyridyl)-N-(α-thenyl)-N',N'-dimethylethylenediamine methiodide melts at 156–157° C. after crystallization from absolute ethyl alcohol.

EXAMPLE 2

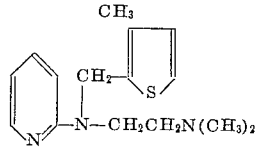

1.5 g. of sodium is converted into sodamide in the usual manner and suspended in 100 cc. of dry toluene. After the addition of 10.7 g. of N-(α-pyridyl)-N',N-dimethylethylene-diamine the mixture is stirred and heated for one hour. Then 7.0 g. of β-methyl-α-thenyl chloride is gradually added, followed by several hours more of refluxing and stirring.

The product is isolated as described in Example 1. The N-(α-pyridyl)-N-(β-methyl-α-thenyl)-N',N'-dimethylethylene-diamine boils at 170–175° C. at 1 mm. pressure.

EXAMPLE 3

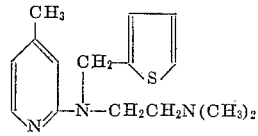

The procedure in Example 1 is followed except that N-(γ-methyl-α-pyridyl)-N',N'-dimethylethylenediamine, prepared as in Example 5, is substituted for the N-(α-pyridyl)-N',N'-dimethylethylenediamine. The N(γ-methyl-α-pyridyl)-N-(α-thenyl)-N',N'-dimethylethylenediamine thus obtained boils at 123–124° C. at 3 mm., $n_D^{28}$, 1.5346.

EXAMPLE 4

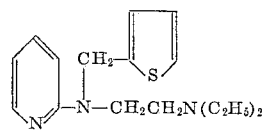

10 g. of α-pyridyl-α-thenylamine, obtained as in Example 6, is converted to the sodio derivative by heating with a suspension of 2.2 g. of sodamide in 80 cc. of toluene for two hours. After the addition of 8 g. of β-diethylaminoethyl chloride, the mixture is stirred and refluxed overnight. The crude basic product is isolated as described in Example 1. By distilling this concentrate, the N-(α-pyridyl)-N-(α-thenyl)-N',N'-diethylethylenediamine is obtained as an oil which boils at 187–190° at 4 mm., $n_D^{26}$ 1.5695. In an analogous manner, there are obtained:

(1) By employing -piperidinoethyl chloride, the base (β-piperidinoethyl)-α-pyridyl-α-thenylamine B. P. 208–210° C. at 4 mm. $n_D^{26}$ 1.5884. The addition of hydrogen chloride gas to an ether solution of the base precipitated the hydroscopic trihydrochloride salt. It melts at 115–117° C. after crystallization from an absolute alcohol-ether mixture.

(2) By employing β-di-n-butylamino-propyl chloride, the base N-(α-pyridyl)-N-(α-thenyl)-N',N'-di-n-butyl-1.3-diaminopropane B. P. 195–196° C. at 1 mm. pressure.

(3) By employing β-(N-benzyl-N-butyl-amino)-ethyl chloride, the base, N-(α-pyridyl)-N-(α-thenyl)-N'-benzyl-N'-butyl-ethylenediamine B. P. 223–225° C. at 1 mm., $n_D^{26}$ 1.5820.

(4) By employing γ-morpholino-β,β-dimethyl-propyl chloride, the base (γ-morpholino-β,β-dimethylpropyl)-α-pyridyl-α-thenylamine B. P. 200–202° C. at 1 mm.

(5) By employing ω-diethylaminoundecyl chloride, the base N-(α-pyridyl)-N-(α-thenyl)-N',N'-diethyl-1,11-diamino-undecane, B. P. 230–235° C. at 1 mm.

EXAMPLE 5

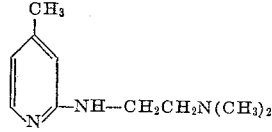

A suspension of sodamide, prepared from 9.0 g. of sodium in the usual manner, in 200 cc. of dry toluene is refluxed and stirred with 32.4 g. of β-methyl-α-aminopyridine for one hour. Then 32.2 g. of β-dimethylaminoethyl chloride is added and the mixture heated several hours longer. The basic material is isolated as described in Example 1. The N-(γ-methyl-α-pyridyl)-N',N'-dimethylethylenediamine thus obtained has B. P. 119–120° C. at 2 mm. pressure.

EXAMPLE 6

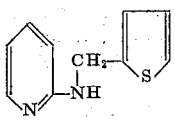

The sodio derivative of α-aminopyridine is prepared by adding 95 g. of this amine to 200 cc. of boiling toluene containing 40 g. of sodamide. The mixture is refluxed and stirred for one hour than 66 g. of α-thenyl chloride is added and the heating and stirring continued for several hours longer. Water is added and the toluene layer separated. The water washings are saturated with potassium carbonate and extracted with ether. The ether extracts and the toluene layer are combined, dried and distilled. There is a forerun consisting of 53 g. of recovered α-aminopyridine. The product, α-pyridyl-α-thenylamine, distills at 160–165 at 3 mm. It solidifies on standing. The same product may be obtained by refluxing a benzene suspension of the sodio derivative of α-thenylamine, which is produced by heating the amine with an equivalent of sodium hydride in the usual manner, with α-bromopyridine. The basic product is isolated as described above.

EXAMPLE 7

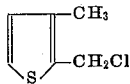

Hydrogen chloride gas is bubbled into a stirred mixture of 45 g. of β-methylthiophene and 20 cc. of concentrated hydrochloric acid, the temperature being maintained between 0° and 2° C. After the dropwise addition of 50 cc. of 40% aqueous formaldehyde, the mixture is stirred and hydrogen chloride passed in for another half hour at 2° C. Then the mixture is poured onto ice. The product is extracted with ether. The extracts are washed successively with water and 5% aqueous solution of sodium bicarbonate, then dried and the solvent removed. The residual oil is distilled whereby the β-methyl-α-thenyl chloride boiling at 77–79° C. at 10 mm. is obtained. A higher boiling fraction, B. P. 150–151° C. at 10 mm. is also realized. This is probably the di-(β-methyl-α-thienyl)-methane.

EXAMPLE 8

N-(α-pyridyl)-N',N'-dimethylethylenediamine

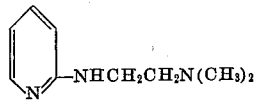

To a benzene suspension of the sodio derivative of α-aminopyridine prepared from 19 g. of this amine and 4.8 g. of sodium hydride in the foregoing manner is added 21.5 g. of β-dimethylaminoethyl chloride. The mixture is heated several hours and the basic material isolated as described in Example 1. The N-(α-pyridyl)-N',N'-dimethylethylenediamine boils at 107–108° at 2 mm.

This same product may be obtained by heating 2-bromopyridine with N,N-dimethylethylenediamine in the presence of pyridine at 150–160° for several hours. The reaction mixture is treated with strong alkali. The organic base is extracted with ether, concentrated, and then subjected to distillation. The product boils at 99–101° at 1 mm. and is identical with the material obtained by the above procedure.

Pharmacological tests with respect to at least one therapeutic property have been made on all the compounds of Examples 1, 2, 3, 4, 4—1, 4—2, 4—3, 4—4, 4—5. The compounds of Examples 2, 3, 4—1, 4—2, 4—3, 4—4, 4—5 have demonstrable local anesthetic activity.

With respect to anti-histamine activity the compounds of Examples 4—2, 4—3, 4—4, and 4—5 appear to be substantially inactive in the relatively low dosage of 0.2 mg./kg. But the compounds of Examples 4 and 4—1 show an antihistamine effect at 0.2 mg./kg. and those of Examples 2, and 3 show an effect at 0.5 mg./kg., which dosage appears to be tolerated without serious toxic effects.

The compound of Example 1 appears to be most effective. In dosage which do not produce noticeable toxic effects, (such as 0.1 mg./kg.), it will protect test animals against several times the lethal dose of histamine. The compound of Example 1 also has demonstrable anti-spasmodic activity.

It will be obvious that the degree of effectiveness of these new compounds with respect to a wide variety of therapeutic uses, will only become finally established after years of clinical experience.

The therapeutic products herein described are usually employed in the form of salts of inorganic acids such as hydrohalic, sulfuric, or phosphoric, or salts of organic acids such as oxalic, succinic, fumaric, maleic, tartaric, gluconic, citric, etc.

By treating an ether solution of the therapeutic base, such as that of Example 1, with one equivalent of hydrogen chloride gas in ether, the monohydrochloride may be obtained as a white solid. A dihydrochloride may also be formed by using two equivalents of hydrogen chloride gas.

The third general method hereinabove enumerated may be modified by reacting the N,N-dialkylalkylenediamine first with the halopyridine and subsequently reacting the product with the haloalkylthiophene.

Others may readily adapt the invention for use under various conditions of service by employing one or more of the novel features herein disclosed or equivalents thereof. As at present advised with respect to the apparent scope of my invention, I desire to claim the following subject matter.

I claim:

1. The process of preparing a N,N-R₃,R₄-N'-2-pyridyl-N'-2-thenyl-A-diamine compound which comprises reacting an α-pyridyl-α-thenylamine with a

so as to produce the diamine compound, where A is a lower alkylene group, and R₃ and R₄ are selected from the group consisting of hydrogen and alkyl and benzyl groups, and a N-hetero group when R₃ and R₄ are joined to produce a ring, said N-hetero group consisting of moropholino and piperidino.

2. The process of preparing N-(α-pyridyl)-N-(α-thenyl)-N',N'-dimethylethylenediamine, which comprises: reacting α-pyridyl-α-thenylamine with a dimethylaminoethyl halide, so as to produce N-(α-pyridyl)-N'-α-thenyl)-N',N'-dimethylethylenediamine.

3. The process of preparing N-(α-pyridyl)-N-α-thenyl)-N',N'-diethylethylenediamine which comprises: reacting α - pyridyl - α - thenylamine with a diethylaminoethyl halide.

4. The process of preparing (β-piperidinoethyl)-α-pyridyl-α-thenylamine which comprises: reacting (α-pyridyl)-α-thenylamine with a β-piperidinoethyl halide.

ARTHUR W. WESTON.

REFERENCES CITED

The following references are of record in the file of this patent:

UNITED STATES PATENTS

| Number | Name | Date |
| --- | --- | --- |
| 2,406,594 | Djerassi | Aug. 27, 1946 |

OTHER REFERENCES

Textbook of Organic Chemistry by George Holmes Richter (1938), Wiley.

Jour. Pharm. and Exp. Ther., vol. 72 (1941), page 265.

Merck Report, Jan. 1945, pages 15–19.

J. A. C. S. (Oct. 1946), pages 1999–2002.

Beilstein (Vierte Auflage), vol. 17, page 37.

Proc. Soc. Exp. Bio. and Med., pp. 55–56.